United States Patent [19]

Brulet et al.

[11] 4,229,308
[45] Oct. 21, 1980

[54] POLYMER LUBRICATING OIL ADDITIVES BEARING NITROGEN GROUPS AND THEIR USE AS ADDITIVES FOR LUBRICATING OILS

[75] Inventors: Daniel Brulet, Claye Souilly; Bernard Chauvel, Ermont, both of France

[73] Assignees: Rhone-Poulenc Industries; Institut Francais du Petrole, both of Paris, France

[21] Appl. No.: 6,867

[22] Filed: Jan. 26, 1979

[30] Foreign Application Priority Data

Feb. 8, 1978 [FR] France .............................. 78 03462
Feb. 8, 1978 [FR] France .............................. 78 03463

[51] Int. Cl.³ ............................................... C10M 1/38
[52] U.S. Cl. ........................................ 252/47; 252/50; 525/333; 525/334; 525/375
[58] Field of Search ............... 252/47, 50; 260/879, 260/880 B; 526/20, 21, 50

[56] References Cited

U.S. PATENT DOCUMENTS

| | | | |
|---|---|---|---|
| 2,838,456 | 6/1958 | Banes et al. ........................ | 252/50 |
| 3,177,190 | 4/1965 | Hsieh .................................. | 526/50 X |
| 3,178,398 | 4/1965 | Strobel et al. ...................... | 526/20 X |
| 3,251,812 | 5/1966 | Hsieh .................................. | 526/20 X |
| 3,281,383 | 10/1966 | Zelinski et al. .................... | 526/20 X |
| 3,492,369 | 1/1970 | Naylor ............................... | 526/21 X |
| 4,020,251 | 4/1977 | Hsieh .................................. | 526/20 |
| 4,106,714 | 8/1978 | Trepka et al. ...................... | 526/20 X |
| 4,145,298 | 3/1979 | Trepka ............................... | 252/51.5 A |

*Primary Examiner*—Andrew Metz

[57] ABSTRACT

Novel lubricating oil polymer additives are obtained by the following:

(1) by preparing, by anionic polymerization, a living diene polymer of an $\overline{M}n$ of between about 20,000 and 300,000;
(2) by functionalizing the said polymer by means of a non-polymerizable nitrogen compound having at least two $<$C—N=C$>$ groups, such as the polypyridines, pyrimidine and its derivatives, pyrazine and its derivatives, 2,4,6-tri-(2-pyridyl)-1,3,5-triazine, dipyridyl sulfide, etc.; and
(3) by hydrogenating the said functionalized polymer.

A variant method of preparaing the said polymers comprises metalating the living polymer before functionalization; in accordance with this variant, the hydrogenation operation may take place before metalation or after functionalization.

The said polymers can be used as additives which improve the viscosity index and the dispersing power of the lubricating oils. The amount of additive added is between about 0.1 and 10 percent by weight.

31 Claims, No Drawings

POLYMER LUBRICATING OIL ADDITIVES BEARING NITROGEN GROUPS AND THEIR USE AS ADDITIVES FOR LUBRICATING OILS

BACKGROUND OF THE INVENTION

The present invention relates to polymers bearing nitrogen groups and their use as additives which impart an improved viscosity index and dispersing power to lubricating oils.

In U.S. Pat. No. 3,752,794, there are disclosed copolymers of para-tert.-butylstyrene and vinylpyridine to increase the viscosity index and the dispersing power of lubricating oils. These copolymers are obtained by radical polymerization and have a wide molecular weight distribution, making them sensitive to shear and having little action on the thickening power of lubricating oils.

The present invention provides new polymers which can be used as additives to improve the viscosity index and the dispersing power of lubricating oils.

It is, therefore, an object of the present invention to provide new polymer lubricating oil additives which impart to lubricating oils an increased viscosity index and dispersing power.

It is also an object of the present invention to provide lubricating oils of enhanced viscosity index and dispersing power, containing a polymer additive of the invention.

Other objects will be apparent to those skilled in the art from the present description.

GENERAL DESCRIPTION OF THE INVENTION

The present invention provides new polymers which can be used as additives to improve the viscosity index and the dispersing power of lubricating oils.

The polymer lubricating oil additives which are an object of the present invention are those obtained by subjecting a living polymer of a number average molecular weight $\overline{Mn}$ of between about 20,000 and 300,000, and preferably between about 30,000 and 150,000, prepared by anionic polymerization of at least one $C_4$-$C_6$ conjugated diene and possibly at least one compound selected from among vinyl aromatic compounds:

(1) to a functionalization operation by reaction with a non-polymerizable nitrogen compound having at least two groups of the structure $>C-N=C<$; and (2) to hydrogenation.

A variant method of preparing the said polymer additives comprises subjecting the said living polymer to a metalation operation before functionalization by the said non-polymerizable nitrogen compound and effecting the hydrogenation operation before the metalation operation or after the functionalization operation.

In accordance with this variant, it is preferable to effect the hydrogenation operation before the metalation and functionalization operations in order to obtain polymers having a better polydispersity index.

Among the living diene polymers which may be employed are:

(1) those obtained by anionic polymerization of at least one diene, such as butadiene, isoprene, or dimethylbutadiene;

(2) random or block copolymers obtained by anionic polymerization of at least one of the above-mentioned dienes and of a vinyl aromatic compound, such as styrene and α-methylstyrene; and (3) the "star" copolymers, obtained from at least one of the above-mentioned dienes, possibly mixed with a vinyl aromatic compound of the styrene or α-methylstyrene type, and divinylbenzene.

The said living polymers can be prepared at a temperature of between about minus 80° and plus 150° C., and preferably between about 0° and 100° C., in the presence of hydrocarbon solvents, such as cyclohexane, hexane, heptane, dodecane, benzene, toluene, xylene, etc., the additive support oils for lubricating oils and/or polar solvents, such as ethers of the dioxan type, tetrahydrofuran, methyl ethers of diethylene or triethylene glycol, amines of the tetramethylene diamine type, and phosphoramides of the hexamethylphosphoramide type. Mixtures of solvents which may contain up to 15 percent polar solvent will preferably be employed.

The catalysts which may be used to carry out the anionic polymerization operation are organometallic catalysts well known to the man skilled in the art, preferably organolithium catalysts, such as n-butyllithium, sec-butyllithium, phenyllithium, 1,4-dilithiobutane, 1,4-dilithio-1,1,4,4-tetraphenylbutane, naphthalene lithium or organosodium compounds, such as naphthalene sodium.

The amount of catalyst to be used is such that the weight ratio of monomer(s) to amount of catalyst in mols is equal to the number average molecular weight $\overline{Mn}$ of the polymer to be obtained.

The so-called "star" polymers can be prepared by the method described in Belgian Pat. No. 850,336, omitting the polymerization step.

As is known to the man skilled in the art, the living polymers obtained by anionic polymerization in the presence of an organometallic compound have a metal atom arranged at one end of said polymer when the organometallic compound used is monofunctional and a metal atom arranged at each end of said polymer when the organometallic compound is bifunctional.

The metalation operation, which is optimally employed, can be carried out in accordance with the known metalation techniques, for instance, by treating the polymer with a complex of diamine and organic compound of an alkali metal (French patent published under No. 2,047,980). For the satisfactory conduct of this operation, it is effected with the use of a complex consisting of N,N,N',N'-tetramethyleneethylene diamine and a butyllithium, in particular sec-butyllithium, with a molar ratio of diamine to butyllithium of between about 0.5 and 1.2, and preferably between about 0.2 and 1.

This operation is carried out at a temperature between about minus 80° and plus 100° C., and preferably between about 0° and 80° C., for generally 1 to 24 hours, in the presence of an inert solvent of the type of those mentioned above as polymerization solvents and, in particular, hydrocarbon solvents.

The amount of metalation complex used is such that the number of mols of organometallic compound of said complex per mol of polymer is less than about 50 and preferably between about 2 and 10.

The metalated polymer obtained has a carbanion site at the end of the chain, as well as one or more carbanion sites along the chain.

Among the non-polymerizable nitrogen compounds which can be used to carry out the functionalization operation, mention may be made, preferably, of heterocyclic compounds, such as:

the polypyridines having less than 20 pyridyl groups, such as 2,2'-bipyridine, tripyridine, etc.;

pyrimidine and its derivatives, such as quinazoline, naphtridine, etc.;

pyrazine and its derivatives, such as quinoxaline and pyridopyrazine;

2,4,6-tri(2-pyridyl)-1,3,5-triazine, dipyridyl sulfide, etc.

The said operation is carried out at a temperature of between about 10° and 80° C., and preferably between about 30° and 60° C. This operation is rapid; in general, it takes less than an hour.

The amount of non-polymerizable nitrogen compound to be used is such that the molar ratio of nitrogen compound to organometallic compound(s) used for the polymerization and, if applicable, the metalation (that is to say, the ratio of mols of nitrogen compound to number of carbanion sites) is at least 1.

When the living polymer has not undergone a metalation operation, this ratio is preferably equal to 1 or 2; when the living polymer has undergone a metalation operation, this ratio is preferably between about 1 and 2.

The hydrogenation step is carried out preferably in the presence of catalytic systems obtained by reaction of derivatives of transition metals, such as the nickel or cobalt carboxylates or acetylacetonates, with organo-reduction compounds such as the organoaluminums, the organolithiums or their hydrides, lithium or aluminum hydrides, or mixed hydrides of lithium and aluminum. Conventional hydrogenation techniques employing catalysts having a base of Raney nickel, or platinum or palladium deposited on carbon, can also be employed.

The solvents which can be employed to effect the hydrogenation step are the same as those used to carry out the anionic polymerization step.

In order to have good stability to thermal oxidation, at least 85 percent, and preferably at least 95 percent, of the olefin double-bonds should be hydrogenated.

The hydrogenation catalyst can be eliminated by filtration, centrifugation, or treatment with an adsorbent earth.

An important object of the invention is the polymers obtained in accordance with a variant of the method described above, which variant consists in carrying out a grafting operation after the metalation operation and prior to the functionalization operation. The said operation is carried out by addition to the medium of a $C_4$–$C_6$ conjugated diene and/or of a vinyl aromatic monomer, such as styrene or α-methylstyrene.

The grafting operation is carried out at a temperature of between about minus 80° and plus 150° C., and preferably between about 0° and 100° C., generally for 1 to 3 hours, and more particularly, for 1 or 2 hours.

The amount of monomer to be grafted which is employed is such that the weight of grafts corresponds to about 1 to 30 percent, and preferably about 1 to 10 percent, of the weight of the grafted polymer.

Another important object of the present invention is the use of the new polymers having nitrogen groups as additives for improving the viscosity index and the dispersing power of lubricating oils.

The oils which can be used are oils of naphthene, paraffin, or mixed base. They can be derived from coal products or synthetic products such as alkylene polymers, polymers of the type of alkylene oxide and their derivatives, including alkylene oxide polymers prepared by polymerizing alkylene oxide in the presence of water or alcohols. The alkylbenzenes, dialkylbenzenes, polyphenyls, alkylbiphenylethers and polymers of silicon can also be employed. The quantity of additives to be added is between about 0.1 and 10 percent of the weight of lubricating oil, and preferably between about 1 and 5 percent.

Additional additives can also be employed in order to obtain the required stability, additional detergency and dispersing power, as well as the anti-wear and anti-corrosion properties required in modern lubricating compositions.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

Comparative Test 1130 g. cyclohexane which has been dried over a molecular sieve and degasified with argon are introduced into a reactor, followed by 0.95 g. of dimethyl ether of dioxyethylene glycol. 146 g. of butadiene and $3 \times 10^{-3}$ mols of butyllithium are then added. Polymerization is allowed to take place for 3 hours at 60° C., under argon, and $2.3 \times 10^{-3}$ mols of isopropanol are added.

1050 g. of the above solution are then taken and 180 mg. are added thereto of a catalyst having a base of triethylaluminum and cobalt octoate (3.6 percent Co and 6.3 percent Al). A pressure of 50 bars is maintained for 2 hours at 100° C. After verification of the olefin unsaturation by NMR, the solution is treated with 2 g. of Clarsil MO2 (registered trademark), an adsorbent earth comprising an aluminum silicate containing about 70.5 percent silica and about 15 percent aluminum oxides, at 80° C. for 2 hours and then filtered so as to retain less than 10 ppm. of cobalt.

The solution is then mixed with 200 Neutral lubricating oil so as to obtain, after evaporation of the cyclohexane under vacuum at 120° C., a 2 percent solution by weight of polybutadiene.

The following characteristics are then determined:
the thickening power. It is expressed by the concentration of polymer necessary to obtain a viscosity of 14 cst (centistokes) at 100° C. in 200 Neutral oil;
the VIE (Viscosity Index Extended), in accordance with ASTM Standard 2270;
the dispersing power, in accordance with the method described by V. A. Gates, et al., in SAE preprint No. 572 (1955) or by A. Schilling in "Les Huiles Pour Moteurs et Le Graissage Des Moteurs," ("Motor Oils and the Lubricating of Engines"), published by Technip, Volume 1, page 89 (1962).

The method is carried out using an SAE 30 oil containing 2 percent of the product prepared above and 1 percent sludge.

The mixture of treated oil and sludge is separated into six fractions which are agitated and subjected to one of the following six heat treatments:
one fraction subjected to 50° C. for 10 minutes;

one fraction subjected to 50° C. for 10 minutes in the presence of 1 percent water;
one fraction subjected to 200° C. for 10 minutes;
one fraction subected to 200° C. for 10 minutes in the presence of 1 percent water;
one fraction subjected to 250° C. for 10 minutes;
one fraction subjected to 280° C. for 10 minutes.

One drop of each mixture obtained after heat treatment is deposited on filter paper. Rating is effected at the end of 24 hours; for each spot there is calculated the percentage of dispersed product referred to the drop of oil by forming the ratio of the respective diameters of the drop of oil and the dispersed product. The higher the percentage of dispersed product, the better the dispersion with respect to the sludge.

The characteristics of the product are set forth in Table I, below.

EXAMPLE 2

A polymerization operation is carried out as in Example 1 starting with:
146 g. of butadiene, and
$3 \times 10^{-3}$ mols of butyllithium.

The operation takes place for 3 hours at 60° C., whereupon $3 \times 10^{-3}$ mols of 2.2′ bipyridine are added (which represents a ratio of 2.2′ bipyridine to butyllithium of 1). The functionalization operation is carried out for 45 minutes at 60° C. with agitation.

1050 g. of resultant solution are taken and a hydrogenation operation is carried out as in the preceding example using 540 mg. of hydrogenation catalyst.

The polymer obtained is formed of chains containing a single bipyridyl unit at the chain end.

EXAMPLE 3

This example is carried out under conditions similar to those of Example 2, employing 146 g. of a mixture of butadiene and styrene in a weight ratio of 90:10 instead of pure butadiene, and effecting the functionalization operation at 30° C. for 55 minutes.

EXAMPLE 4

This example is carried out under conditions similar to those described in Example 2, using 146 g. of a mixture of butadiene and isoprene in a weight ratio of 90:10, instead of pure butadiene.

EXAMPLE 5

This example is carried out under conditions similar to those described in Example 2 using:
146 g. of a 90:10 by weight mixture of isoprene and styrene, instead of pure butadiene;
$3 \times 10^{-3}$ mols of 2-2′-2″-tripyridine instead of 2-2′-bipyridine.

EXAMPLE 6

This example is carried out under conditions similar to those of Example 2 using:
146 g. of butadiene;
$3 \times 10^{-3}$ mols of 1,1-dilithio-1,1,4,4-tetraphenyl butane;
$6 \times 10^{-3}$ mols of 2,2-bipyridine which represents a molar ratio of bipyridine to organolithium of 2 or a molar ratio of bipyridine to polymer of 2.

The polymer obtained is formed of chains containing two bipyridyl units, namely, one unit at each of the two ends of the chain.

EXAMPLE 7

This example is carried out under conditions similar to those of Example 2, using $3 \times 10^{-3}$ mols of 2,4,6-tri(2-pyridyl)1,3,5-triazine instead of 2,2′-bipyridine.

EXAMPLE 8

This example is carried out under conditions similar to those of Example 2, using $3 \times 10^{-3}$ mols of dipyridyl sulfide instead of 2,2-′bipyridine.

EXAMPLE 9

This example is carried out under conditions similar to those of Example 2, using $6 \times 10^{-3}$ mols of pyrazine instead of $3 \times 10^{-3}$ mols of bipyridine, which corresponds to a molar ratio of pyrazine to butyllithium of 2 or a ratio of pyrazine to polymer of 2.

The polymer obtained is formed of chains containing a single recurrent unit derived from pyrazine at the chain end.

EXAMPLE 10

This example is carried out under conditions similar to those of Example 3 using:
146 g. of a 90:10 by weight mixture of butadiene and styrene;
$1.5 \times 10^{-3}$ mols of n-butyllithium;
$1.5 \times 10^{31}\,^3$ mols of 2,2′-bipyridine.

EXAMPLE 11

A polymerization operation is carried out in the same manner as in Example 1 using:
146 g. of butadiene;
$3 \times 10^{-3}$ mols of butyllithium.

The operation takes place for 3 hours at 60° C. The medium is cooled to 20° C. Then $15 \times 10^{-3}$ mols of secbutyllithium and $15 \times 10^{-3}$ mols of N,N,N′,N′-tetramethyleneethylenediamine (TMEDA) are added. The metalation operation takes place for 2 hours at 50° C. with agitation.

$18 \times 10^{-3}$ mols of 2,2′-bipyridine are then added, with represents a ratio of bipyridine to organometallic compound (n-butyllithium+sec-butyllithium) of 1. The functionalization operation is carried out for 45 minutes at 60° C.

1050 g. of resultant solution are taken and a hydrogenation operation is carried out as in Example 1, using 720 mg. of hydrogenation catalyst.

The resultant polymer contains several recurrent nitrogen units per chain, with one unit at one end.

EXAMPLE 12

This example is carried out under conditions similar to those of Example 11, using 146 g. of a mixture of butadiene and styrene in a weight ratio of 90:10 instead of pure butadiene.

EXAMPLE 13

This example is carried out under conditions similar to those described in Example 11, using 146 g. of a mixture of isoprene and styrene in a weight ratio of 90:10 instead of butadiene.

EXAMPLE 14

This example is carried out under conditions similar to those described in Example 11, using a $3 \times 10^{-3}$ mols of pyrazine instead of 2,2′-bipyridine.

EXAMPLE 15

This example is carried out under conditions similar to those of Example 11, using a $3 \times 10^{-3}$ mols of bipyridyl sulfide instead of 2,2'-bipyridine.

EXAMPLE 16

This example is carried out under conditions similar to those of Example 11, using a $3 \times 10^{-3}$ mols of pyrimidine instead of 2,2'-bipyridine.

EXAMPLE 17

A polymerization operation is carried out as in Example 11 using:
  146 g. of butadiene, and
  $3 \times 10^{-3}$ mols of butyllithium for 3 hours at 60° C.

Thereupon a metalation operation is carried out with the use of $15 \times 10^{-3}$ mols of sec-butyllithium and $15 \times 10^{-3}$ mols of TMEDA for 2 hours at 50° C. with agitation.

$36 \times 10^{-3}$ mols of styrene are then added to effect a grafting operation; it is carried out at 60° C. for 2 hours.

$18 \times 10^{-3}$ mols of 2,2'-bipyridine are then added; the functionalization operation is carried out for 55 minutes at 30° C.

1050 g. of the resultant solution are taken and a hydrogenation operation carried out as in Example 11.

The grafted polymer obtained contains several nitrogen units per chain, including one unit at one end.

EXAMPLE 18

This example is carried out under conditions similar to those of Example 12 using:
  146 g. of 90:10 by weight mixture of butadiene and styrene;
  $1.5 \times 10^{-3}$ mols of n-butyllithium;
  $16.5 \times 10^{-3}$ mols of 2,2'-dipyridine.

EXAMPLE 19

This example is carried out under conditions similar to those of Example 13 using;
  146 g. of 90:10 by weight mixture of isoprene and styrene;
  $3 \times 10^{-3}$ mols of n-butyllithium;
  $24 \times 10^{-3}$ mols of sec-butyllithium
  $24 \times 10^{-3}$ mols of TMEDA;
  $27 \times 10^{-3}$ mols of 2,2'-bipyridine.

EXAMPLE 20

A polybutadiene sequence is produced as in Example 1 using:
  146 g. of butadiene, and
  $3 \times 10^{-3}$ mols of n-butyllithium for 3 hours at 60° C. Thereupon $30 \times 10^{-3}$ mols of styrene are added, and the polymerization operation is continued for 2 hours at 60° C. in order to produce a very short sequence of styrene.

A hydrogenation operation is carried out in accordance with the procedure described in Example 1. It is filtered over adsorbent earth and dried over a molecular sieve. $15 \times 10^{-3}$ mols of sec-butyllithium and $15 \times 10^{-3}$ mols of TMEDA are then added and a metalation operation is carried out as described in Example 11. Then $15 \times 10^{-3}$ mols of 2,2'-bipyridine are added and heating is effected at 60° C. for 45 minutes.

The block copolymer obtained contains several nitrogen units per chain, including one unit at one end.

The characteristics of the products prepared in Examples 2 to 20 are given in Table I to VI, inclusive, below.

TABLE I

| EXAMPLES | | 1 | 2 | 3 | 4 |
|---|---|---|---|---|---|
| Monomers | | Bu | Bu | Bu/Sty | Bu/Iso |
| Organolithium | | Buli | Buli | Buli | Buli |
| Nitrogen compound | | — | BiP | BiP | BiP |
| $\overline{Mn}$ | | 51,300 | 48,900 | 52,400 | 59,250 |
| Nitrogen compound/ polymer (molar) | | — | 1 | 1 | 1 |
| PI | | 1.3 | 1.4 | 1.35 | 1.5 |
| % hydrogenation | | 98 | 100 | 100 | 98 |
| Dispersive | 50° C. | 44 | 89 | 91 | 90 |
| power | 50° C. + H$_2$O | 43 | 91 | 93 | 90 |
| | 200° C. | 36 | 89 | 90 | 89 |
| | 200° C. + H$_2$O | 39 | 88 | 91 | 88 |
| | 250° C. | 36 | 81 | 85 | 82 |
| | 280° C. | 35 | 79 | 85 | 81 |
| | Σ | 223 | 517 | 535 | 520 |
| VIE | | 140 | 129 | 132 | 138 |
| thickening power | | 2.2 | 2 | 1.6 | 1.5 |

In All Tables:
Bu:butadiene
Sty:styrene
Iso:isoprene
Buli:butyllithium
dili:dilithio-1,1,4,4-tetraphenylbutane
BiP:bipyridine
PI:polydispersion index

TABLE II

| EXAMPLES | | 5 | 6 | 7 | 8 |
|---|---|---|---|---|---|
| Monomers | | Iso/Sty | Bu | Bu | Bu |
| Organolithium | | Buli | Dili | Buli | Buli |
| Nitrogen compound | | TriP | BiP | TriPT | SP |
| Nitrogen compound/ polymer (molar) | | 1 | 2 | 1 | 1 |
| $\overline{Mn}$ | | 56,700 | 53,600 | 43,200 | 54,200 |
| PI | | 1.5 | 1.6 | 1.9 | 1.4 |
| % hydrogenation | | 99 | 98 | 97 | 96 |
| dispersive | 50° C. | 93 | 89 | 91 | 93 |
| power | 50° C. + H$_2$O | 94 | 90 | 92 | 91 |
| | 200° C. | 92 | 88 | 91 | 89 |
| | 200° C. + H$_2$O | 90 | 86 | 90 | 88 |
| | 250° C. | 87 | 83 | 85 | 86 |
| | 280° C. | 85 | 80 | 83 | 81 |
| | Σ | 541 | 516 | 532 | 528 |
| VIE | | 136 | 132 | 131 | 134 |
| thickening power | | 1.5 | 1.9 | 2.3 | 1.9 |

TriP:tripyridine
dili:dilithio-1,1,4,4-tetraphenylbutane
triPT:tripyridyltriazine
SP: dipyridyl sulfide

TABLE III

| EXAMPLES | | 9 | 10 |
|---|---|---|---|
| Monomers | | Bu | Bu/Sty |
| Organolithium | | Buli | Buli |
| Nitrogen compound | | Py | BiP |
| Nitrogen compound/ polymer (molar) | | 2 | 1 |
| $\overline{Mn}$ | | 59,100 | 107,350 |
| PI | | 1.3 | 1.4 |
| % hydrogenation | | 97 | 98 |
| dispersive | 50° C. | 89 | 88 |
| power | 50° C. + H$_2$O | 90 | 90 |
| | 200° C. | 88 | 87 |
| | 200° C. + H$_2$O | 89 | 89 |

TABLE III-continued

| EXAMPLES | 9 | 10 |
|---|---|---|
| 250° C. | 85 | 84 |
| 280° C. | 85 | 81 |
| Σ | 526 | 519 |
| VIE | 144 | 139 |
| thickening power | 1.8 | 1.4 | py: pyrazine

TABLE IV

| EXAMPLES | 11 | 12 | 13 |
|---|---|---|---|
| Monomers | Bu | Bu/Sty | Iso/Sty |
| Nitrogen compound | BiP | BiP | BiP |
| $\overline{Mn}$ | 55,000 | 58,300 | 59,200 |
| PI | 1.65 | 1.5 | 1.55 |
| % hydrogenation | 97 | 98 | 96 |
| dispersive 50° C. | 91 | 90 | 92 |
| power 50° C. + H$_2$O | 92 | 90 | 93 |
| 200° C. | 88 | 87 | 87 |
| 200° C. + H$_2$O | 88 | 88 | 89 |
| 250° C. | 86 | 84 | 85 |
| 280° C. | 83 | 83 | 82 |
| Σ | 528 | 522 | 528 |
| VIE | 138 | 142 | 136 |
| thickening power | 2.1 | 1.7 | 1.5 |

TABLE V

| EXAMPLES | 14 | 15 | 16 | 17 |
|---|---|---|---|---|
| Monomers | Bu | Bu | Bu | Bu/Sty |
| Nitrogen compound | Py | SP | Pyri | BiP |
| $\overline{Mn}$ | 60,250 | 58,300 | 52,100 | 63,100 |
| PI | 1.5 | 1.6 | 1.7 | 1.6 |
| % hydrogenation | 98 | 97 | 99 | 97 |
| dispersive 50° C. | 93 | 88 | 89 | 90 |
| power 50° C. + H$_2$O | 94 | 90 | 91 | 91 |
| 200° C. | 92 | 87 | 85 | 85 |
| 200° C. + H$_2$O | 90 | 88 | 86 | 86 |
| 250° C. | 87 | 85 | 83 | 82 |
| 280° C. | 85 | 82 | 81 | 81 |
| Σ | 541 | 520 | 515 | 515 |
| VIE | 139 | 136 | 135 | 132 |
| thickening power | 1.9 | 1.8 | 2.3 | 1.8 |

Pyri: dipyrimidine

TABLE VI

| EXAMPLES | 18 | 19 | 20 |
|---|---|---|---|
| Monomers | Bu/Sty | Iso/Sty | Bu/Sty |
| Nitrogen compound | BiP | BiP | BiP |
| $\overline{Mn}$ | 111,500 | 60,250 | 58,300 |
| PI | 1.55 | 1.7 | 1.35 |
| % hydrogenation | 98.5 | 95 | 99 |
| dispersive 50° C. | 89 | 94 | 89 |
| power 50° C. +H$_2$O | 91 | 96 | 90 |
| 200° C. | 86 | 93 | 87 |
| 200° C. +H$_2$O | 87 | 91 | 88 |
| 250° C. | 82 | 86 | 84 |
| 280° C. | 80 | 85 | 83 |
| Σ | 515 | 545 | 521 |
| VIE | 141 | 137 | 139 |
| thickening power | 1.4 | 1.9 | 2.1 |

As can be seen from the foregoing tables, the additives of the invention impart excellent properties to lubricating oils.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A lubricating oil polymer additive produced by subjecting a living polymer of a number average molecular weight $\overline{Mn}$ of between about 20,000 and 300,000, prepared by anionic polymerization of at least one C$_4$-C$_6$ conjugated diene or a copolymer of a C$_4$-C$_6$ conjugated diene with a vinyl aromatic compound to a functionalization operation by reaction with a non-polymerizable heterocyclic nitrogen compound having at least two groups of the structure $>C-N+C<$; and to a hydrogenation to hydrogenate at least about 85 percent of the olefin double bonds.

2. A lubricating oil polymer additive according to claim 1, wherein the anionic polymerization includes at least one C$_4$-C$_6$ conjugated diene and at least one compound selected from among vinyl aromatic compounds.

3. A lubricating oil polymer additive according to claim 1, wherein the functionalization operation is preceded by a metalation of the said living polymer.

4. A lubricating oil polymer additive according to claim 3, wherein the hydrogenation operation is carried out before the metalation operation.

5. A lubricating oil polymer additive according to any of claims 1 to 4, wherein the said living polymer has a number average molecular weight $\overline{Mn}$ of between about 30,000 and 150,000.

6. A lubricating oil polymer additive according to any of claims 1 to 4, wherein the living polymer is a random or block polymer or copolymer of at least one diene, selected from among butadiene, isoprene, and dimethylbutadiene.

7. A lubricating oil polymer additive according to any of claims 1 to 4, wherein the living polymer is a random or block copolymer of at least one diene selected from among butadiene, isoprene, and dimethylbutadiene, and of a vinyl aromatic compound selected from among styrene and α-methylstyrene.

8. A lubricating oil polymer additive according to any of claims 1 to 4, wherein the living polymer is a "star" copolymer obtained from at least one diene selected from among butadiene, isoprene, and dimethylbutadiene, optimally mixed with a vinyl aromatic compound selected from among styrene and α-methylstyrene, and from divinylbenzene.

9. A lubricating oil polymer additive according to any of claims 1 to 4, wherein the said living polymer is obtained by anionic polymerization in the presence of organometallic catalysts at a temperature of between about minus 80° and plus 150° C.

10. A lubricating oil polymer additive according to claim 9, wherein the said living polymer is obtained in the presence of a member selected from n-butyllithium or of 1,4-dilithio-1,1,4,4-tetraphenylbutane, at a temperature of between about 0° and 100° C.

11. A lubricating oil polymer additive according to claim 3 or claim 4, wherein the metalation operation is carried out at a temperature between about minus 80° and plus 150° C., in the presence of a complex consisting of diamine and organic compound of an alkali metal.

12. A lubricating oil polymer additive according to claim 11, wherein the metalation operation is carried out at a temperature of between about 0° and 80° C., in the presence of a complex formed of N,N,N',N'-tetramethyleneethylenediamine and a butyllithium, with a molar ratio of diamine to butyllithium of between about 0.5 and 1.2.

13. A lubricating oil polymer additive according to claim 12, wherein the butyllithium is sec-butyllithium and the molar ratio of diamine to sec-butyllithium is between about 0.7 and 1.

14. A lubricating oil polymer additive according to claim 12, wherein the amount of complex employed is such that the ratio of the number of mols of organometallic compound in said complex per mol of polymer is less than 50.

15. A lubricating oil polymer additive according to claim 14, wherein the ratio of the number of mols of organometallic compound in said complex per mol of polymer is between about 2 and 10.

16. A lubricating oil polymer additive according to claim 3 or claim 4, wherein the metalation step is followed by a grafting operation by addition of a monomer selected from among the $C_4$–$C_6$ conjugated dienes, styrene, or their mixture, prior to the functionalization step.

17. A lubricating oil polymer additive according to claim 16, wherein the grafting operation is carried out at a temperature of between about minus 80° and plus 150° C.

18. A lubricating oil polymer additive according to claim 17, wherein the grafting operation is carried out at a temperature of between about 0° and 100° C.

19. A lubricating oil polymer additive according to any of claims 1 to 4, wherein the nonpolymerizable nitrogen compound is a heterocyclic compound selected from among polypyridines having less than 20 pyridyl groups, pyrimidine and its derivatives, pyrazine and its derivatives, 2,4,6-tri(2-pyridyl)-1,3,5-triazine, and dipyridyl sulfide.

20. A lubricating oil polymer additive according to claim 19, wherein the polypyridines are selected from among 2,2'-dipyridine and tripyridine.

21. A lubricating oil polymer additive according to claim 19, wherein the derivatives of pyrimidine are selected from among quinazoline and naphtridine.

22. A lubricating oil polymer additive according to claim 19, wherein the derivatives of pyrazine are selected from among quinoxaline and pyridopyrazine.

23. A lubricating oil polymer additive according to any of claims 1 to 4, wherein the amount of nonpolymerizable nitrogen compound is such that the ratio of mols of nitrogen compound to the number of functionalizable carbanion sites is at least 1.

24. A lubricating oil polymer additive according to claim 1, wherein the amount of nonpolymerizable nitrogen compound is such that the ratio of mols of nitrogen compound to number of functionalizable carbanion sites is equal to 1 or 2.

25. A lubricating oil polymer additive according to claim 3 or claim 4, wherein the amount of nonpolymerizable nitrogen compound is such that the ratio of mols of nitrogen compounds to number of functionalizable carbanion sites is between 1 and 2.

26. A lubricating oil polymer additive according to any of claims 1 to 4, wherein the functionalization step is carried out at a temperature of between about 10° and 80° C.

27. A lubricating oil polymer additive according to claim 26, wherein the functionalization step is carried out at a temperature of between about 30° and 60° C.

28. A lubricating oil polymer additive according to any of claims 1 to 4, wherein the hydrogenation step is conducted in the presence of a catalytic system obtained by reaction between a transition metal derivative and an organoreduction compound.

29. A lubricating oil polymer additive according to claim 28, wherein the catalytic system has a base of cobalt octoate and triethylaluminum.

30. A lubricating oil improved by the addition of 0.1 to 10 percent of its weight of a polymer additive according to any of claims 1 to 4.

31. A lubricating oil according to claim 30, improved by addition of 1 to 5 percent of its weight of one of the polymer additives according to any of claims 1 to 4.

* * * * *

UNITED STATES PATENT AND TRADEMARK OFFICE
CERTIFICATE OF CORRECTION

PATENT NO. : 4,229,308
DATED : October 21, 1980
INVENTOR(S) : Daniel Brulet et al.

It is certified that error appears in the above—identified patent and that said Letters Patent is hereby corrected as shown below:

Column 2, line 50, delete "0.2" and replace with -- 0.7 --.

Column 6, line 28, delete "$1.5 \times 10^{313}$" and replace with -- $1.5 \times 10^{-3}$ --.

Column 10, line 15, delete " $\geq C - N + C \leq$ " and replace with -- $\geq C - N = C \leq$ --.

In the Abstract: Line 8, delete " $< C - N = C >$ " and replace with -- $\geq C - N = C \leq$ --.

Signed and Sealed this

Third Day of February 1981

[SEAL]

Attest:

RENE D. TEGTMEYER

Attesting Officer          Acting Commissioner of Patents and Trademarks